United States Patent [19]

Forrest et al.

[11] Patent Number: 5,986,268
[45] Date of Patent: *Nov. 16, 1999

[54] ORGANIC LUMINESCENT COATING FOR LIGHT DETECTORS

[75] Inventors: Stephen R. Forrest; Paul E. Burrows, both of Princeton; Vladimir Bulovic, Metuchen; Dmitri Z. Garbuzov, Princeton, all of N.J.

[73] Assignee: The Trustees of Princeton University, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,141

[22] Filed: Jan. 6, 1997

Related U.S. Application Data

[60] Provisional application No. 60/010,013, Jan. 11, 1996.

[51] Int. Cl.$^6$ .............................. G01J 1/58; C09K 11/06
[52] U.S. Cl. ..................................... 250/372; 250/370.11
[58] Field of Search ................................ 250/372, 370.11

[56] References Cited

U.S. PATENT DOCUMENTS

| | | | |
|---|---|---|---|
| 3,912,931 | 10/1975 | Gravisse et al. | 250/372 X |
| 4,087,685 | 5/1978 | Froot . | |
| 4,584,428 | 4/1986 | Garlick . | |
| 4,629,821 | 12/1986 | Bronstein-Bonte et al. . | |
| 5,252,831 | 10/1993 | Weiss | 250/372 X |
| 5,294,870 | 3/1994 | Tang et al. . | |

FOREIGN PATENT DOCUMENTS

| 4304190 | 8/1994 | Germany | 250/372 |
|---|---|---|---|

OTHER PUBLICATIONS vol. 009, No. 315 (E–365), Dec. 11, 1985 & JP 60 148174 A (Seikoushiya:KK), Aug. 5, 1985.

C. Hosokawa, et al., "Highly Efficient Blue Electroluminescence From a Distyrylarylene Emitting Layer With a New Dopant" Appl. Phys. Lett. vol. 67, No. 26 (Dec. 1995) pp. 3853—3855.

C.W. Tang, S.A. VanSlyke, and C.H. Chen, "Electroluminescence of Doped Organic Thin Films", *J. Appl. Phys.*, vol. 65, No. 9., May 1, 1989, pp. 3610.

M.M. Blouke, M.W. Cowens, J.E. Hall, J.A. Westphal, and A.B. Christensen, "Ultraviolet downconverting phospor for use with silicon CCD imagers", *Applied Optics*, vol. 19, No. 19, Oct. 1, 1980.

M.P. Lesser, E. Olszewski, "Optimizing Charge–Coupled Devices for Red and Near–Infrared Observations", SPIE vol. 1071, *Optical Sensors and Electronic Photography*, (1989), pp. 58–65.

G.R. Sims, F. Griffin, and M. Lesser, "Improvements in CCD Efficiency in the UV and Near–IR, " SPIE vol. 1071 *Optical Sensors and Electronic Photography*, (1989) pp. 31–42.

A. Hirsch, A. Zastrow and V. Wittwer, "Sol–gel glasses: A new material for solar fluorescent planar concentrations?", *Solar Energy Materials*, vol. 21 (1990) pp. 151–164.

P.E. Burrows and S.R. Forrest, "Electroluminescence from trap–limited current transport in vacuum deposited organic light emitting devices", *Appl. Phys. Lett.*, vol. 64 (17) (1993) pp. 2285.

(List continued on next page.)

*Primary Examiner*—Constantine Hannaher
*Attorney, Agent, or Firm*—Kenyon & Kenyon

[57] ABSTRACT

An organic luminescent coating such as Aluminum-Tris-Quinolate is applied to a light detector for converting UV to green light to improve the efficiency of the light detector. The coating also provides anti-reflection properties when of sufficient thickness.

12 Claims, 9 Drawing Sheets

OTHER PUBLICATIONS

A. Hinsch, "Organic fluorescent dyes in organically modified $Al_2 O_3$—$S_1$—$O_2$ or $Ti O_2$—$Si O_2$ coatings with varying polymethylmethacryhte content", *Journal of Non/Crystalline Solids*, vol. 147 & 148 (1992), pp. 478–482.

R. Seedorf, H.J. Eichler, and H. Koch, "Detector for the VUV to the IR using sodium salicylate as a combined fluorescent and reflective coating", *Journal of Applied Physics*, vol. 24, No. 9, May 1, 1985.

G.D. Sharma, S.C. Mathur, P.C. Duke, "Organic photovoltaic solar cells based on some pure and sensitized dyes", *Journal of Materials Science*, vol. 26, (1991), pp. 6547–6552.

D.Z. Garbuzov, V. Bulovic, P.E. Burrows, S.R. Forrest, "Photoluminescence efficiency and absorption of aluminum– tris–quinolate ($Alq_3$) thin films", *Chemical Physics Letters*, vol. 249 (1996), pp. 433–437.

D.Z. Garbuzov, S.R. Forrest, A.G. Tsekoun, P.E. Burrows, V. Bulovic̀, and M.E. Thompson "Organic films deposited on Si p–n junctions: Accurate measurements of fluorescence internal efficiency, and application to luminescent antireflection coatings", *Journal of Applied Physics*, vol. 80, No. 8, Oct. 15, 1996.

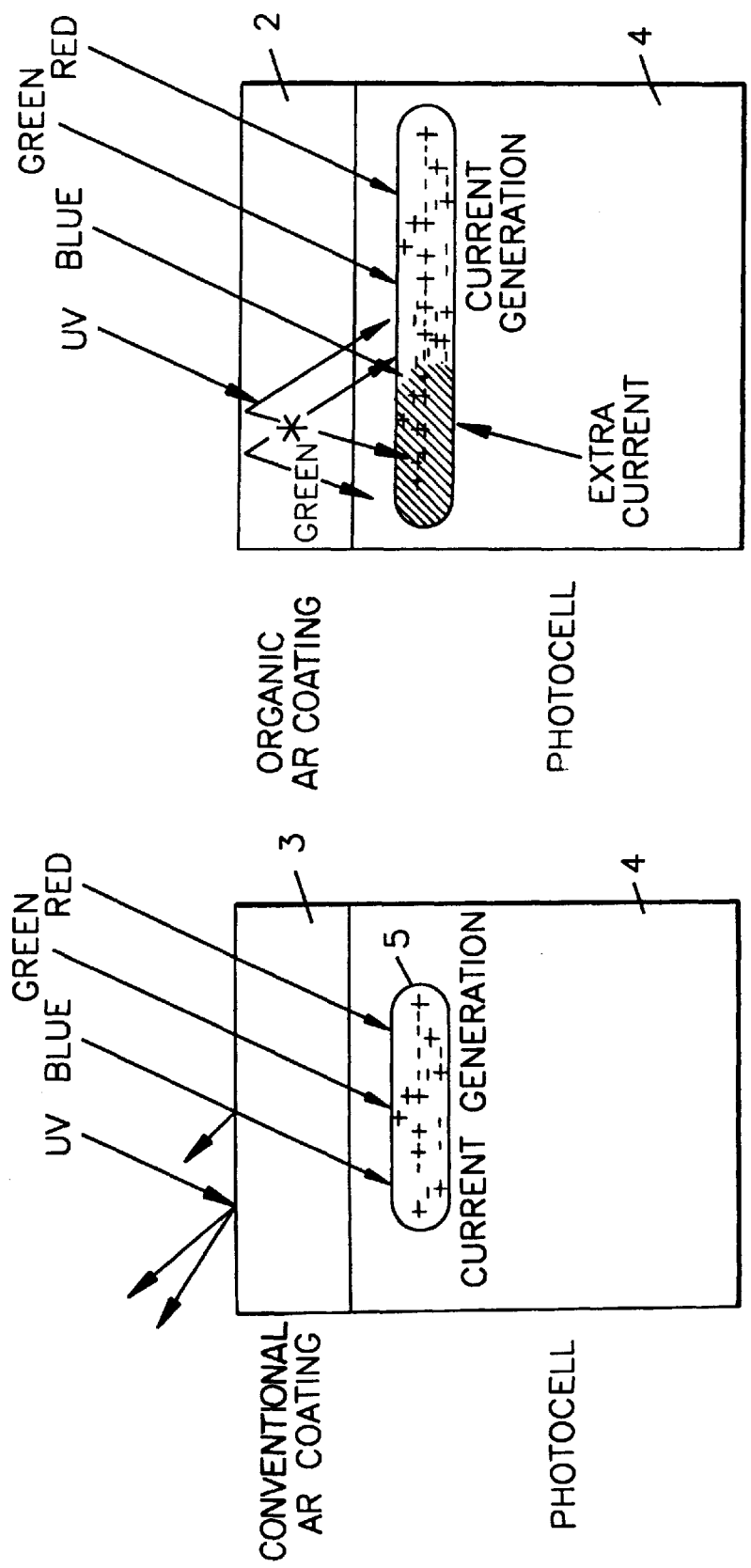

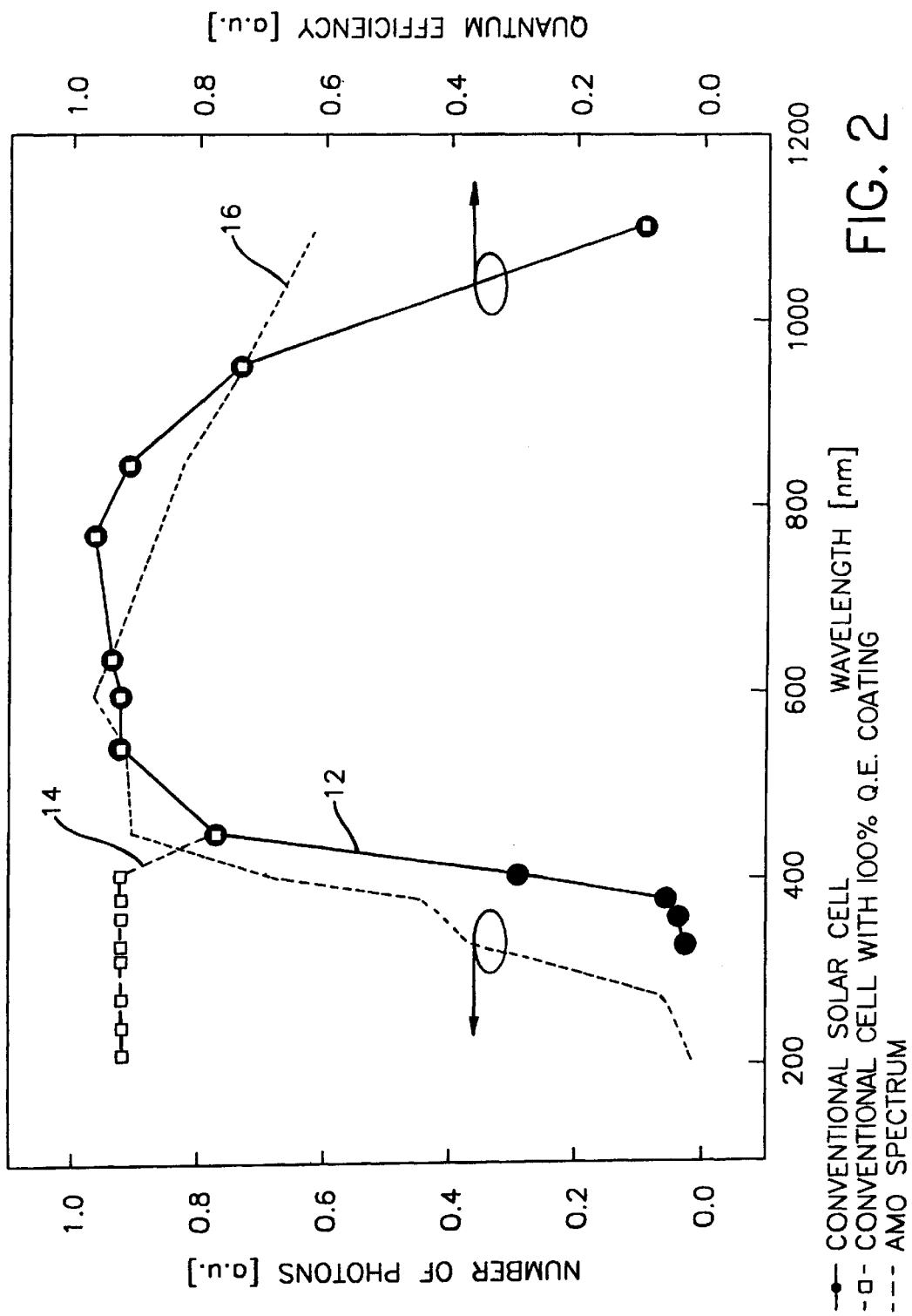

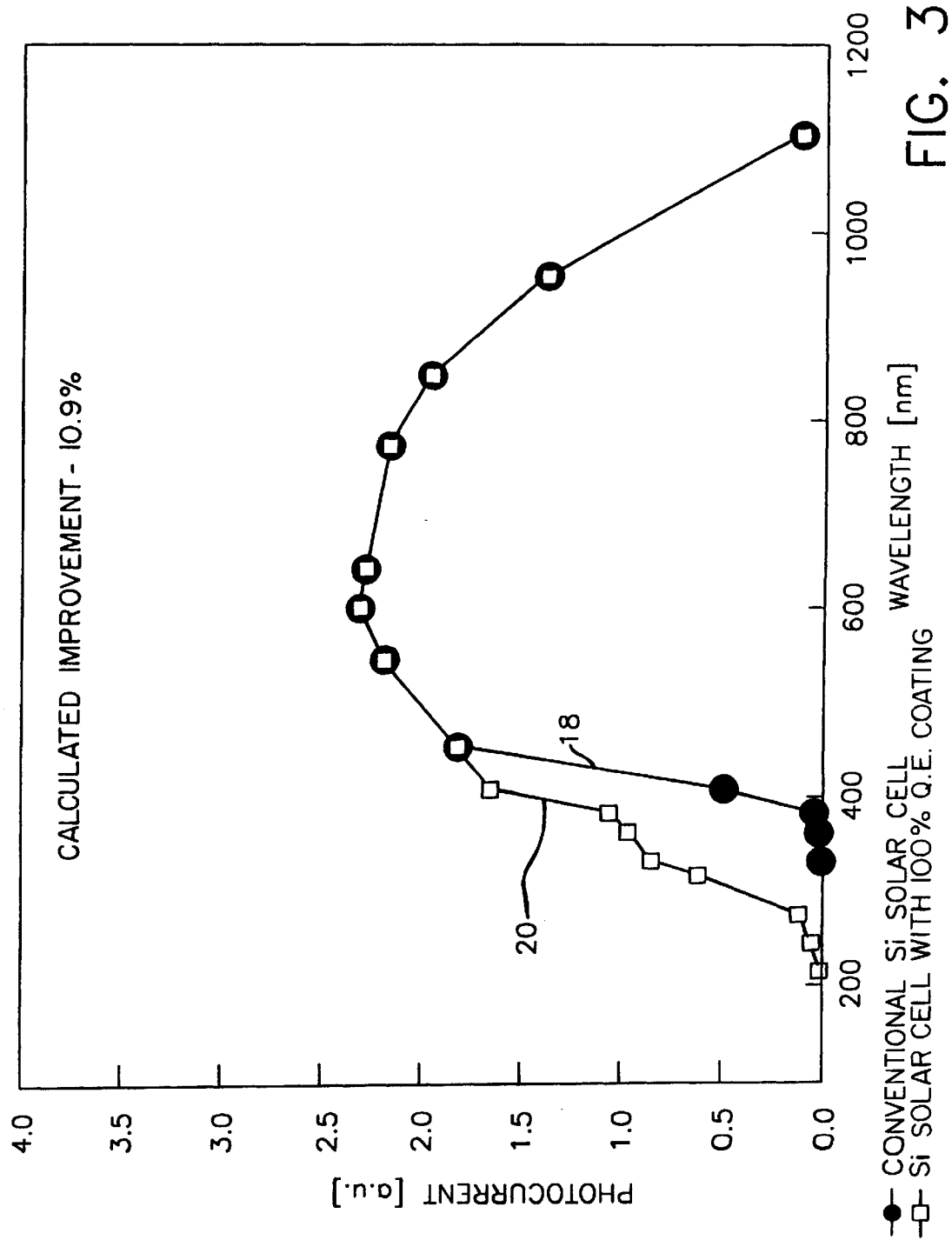

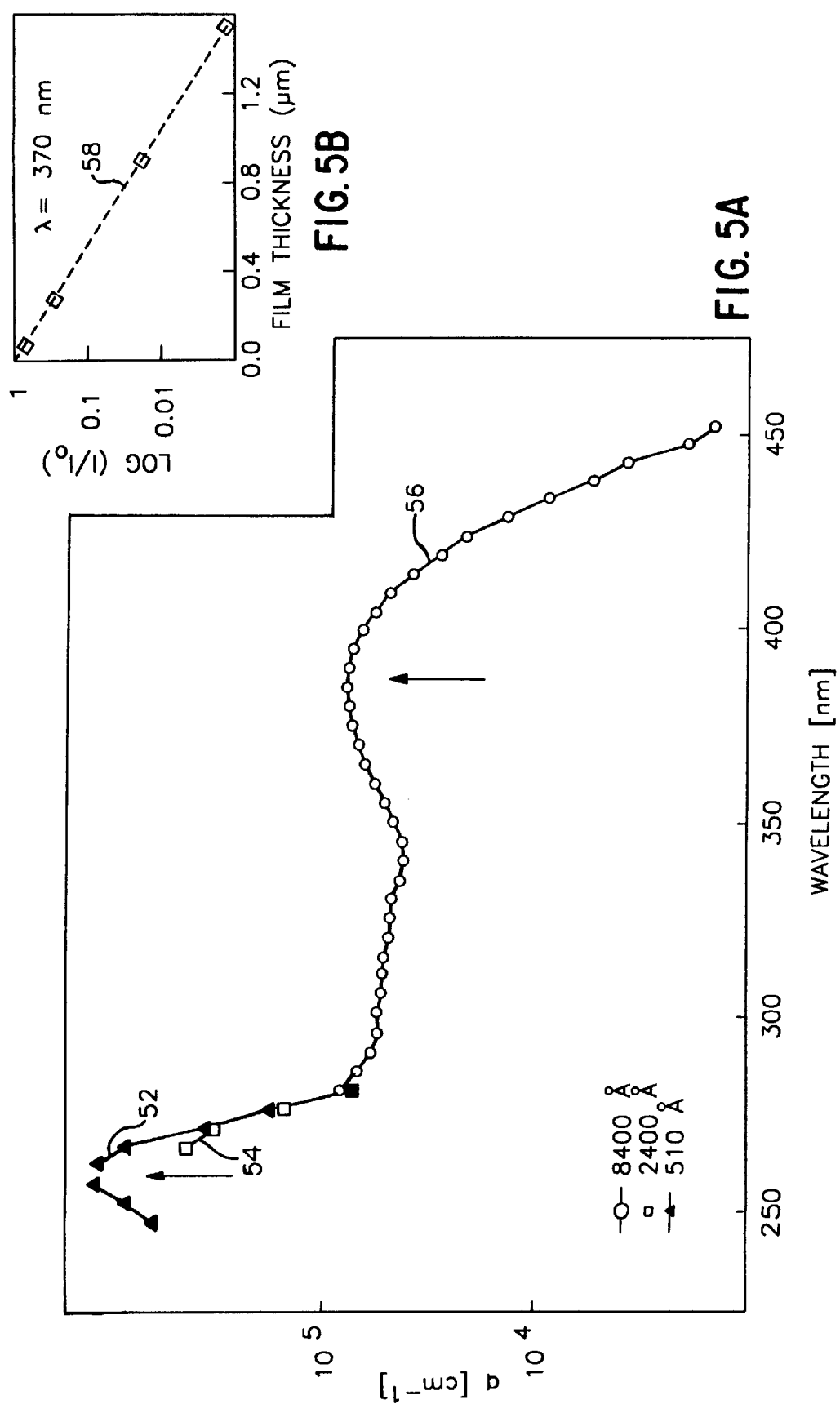

ORGANIC LUMINESCENT COATING FOR LIGHT DETECTORS

RELATED APPLICATION

This application is related to co-pending Provisional Application Ser. No. 60\010,013, filed Jan. 11, 1996, entitled "Organic Luminescent Coating For Light Detectors." The teachings of the latter Provisional Application are incorporated herein by reference to the extent they do not conflict herewith, and Applicant claims the benefit of the earlier filing date of the Provisional Application under 35 U.S.C. 119(e).

GOVERNMENT LICENSE RIGHTS

This invention was made with Government support under Contract No. XAI-3-11167-03, awarded by the Air Force. The government has certain rights in this invention.

FIELD OF THE INVENTION

The field of this invention relates generally to photodetectors, including solar cells, and more particularly to anti-reflection (AR) coatings for photodetectors.

BACKGROUND OF THE INVENTION

Light detectors include solar cells, used to convert light to electrical energy, and photocells and photodiodes used to measure light intensity. Materials for light detectors include semiconductors such as silicon, gallium arsenide, germanium, selenium, and the like. Typically, the light gathering efficiency of these devices is improved by providing them with an Anti-Reflection (AR) coating. If less light is reflected, then more is available for absorption and conversion to an electrical signal. These coatings can be a single layer thick, in which case they are typically a ¼ wavelength of light thick, or they may be multilayer coatings for even greater efficiency. Such coatings are typically composed of glassy insulators such as aluminum oxide, titanium oxide, silicon dioxide, silicon nitride or magnesium fluoride. Furthermore, high sensitivity in the blue and ultra-violet (UV) region of the spectrum is difficult to achieve with conventional semiconductor detectors, since reflectance of semiconductor materials strongly increases in this spectral range. Also, a typical AR-coatings is typically optimized for the green spectral range, becoming less effective in the blue and UV spectral regions.

SUMMARY OF THE INVENTION

An object of the invention is to provide high efficiency solar cells and photodiodes for a broad range of wide spectral bandwidth applications.

Another object of the invention is to provide photocells and photodiodes with increased sensitivity, especially in the blue and UV regions of the spectrum.

Another object of the invention is to provide an apparatus for measuring film properties such as internal and external luminescence quantum efficiency with an accuracy heretofore unobtained with traditional measurement methods such as the integrating spheres. This apparatus can be utilized for identifying candidate coatings for use in high efficiency solar cells, and high sensitivity photocells and photodiodes.

These and other objects of the invention are provided by an improved light detector, which consists of a coating of an organic luminescent material, such as Aluminum-Tris-Quinolate ($Alq_3$, also known as 8-hydroxyquinoline aluminum, Alq), or TPD {N,N'-diphenyl-N, N'-bis(3-methylphenyl) 1,1'-biphenyl-4, 4'-diaminel}, or $Gaq'_2Cl$ {bis-(8-hydroxyquinaldine)-chlorogallium}, on a light detector, preferably as a substitute for a conventional AR coating. When organic film is substituted for the AR coating, the film also acts as an AR coating, if it is thick enough, since it does not absorb appreciably in its own luminescent region of the spectrum. If the coating has a 100% internal luminescence efficiency (efficiency of conversion of the absorbed light into luminescent light), the power efficiency for an amorphous silicon solar cell with such a coating is improved by 11%. Conventional AR coatings can be retained for scratch resistance, at slightly less gain. Alternatively, the organic film can be intentionally designed as a final layer of a multi-layer AR coating.

BRIEF DESCRIPTION OF THE DRAWINGS

Various embodiments of the invention are illustrated and described below with reference to the accompanying drawings, in which like items are identified by the same reference designation, wherein:

FIG. 1a shows a conventional photocell or solar cell of the prior art, the UV portion of the spectrum being partially reflected by the AR coated device surface.

FIG. 1b shows a preferred embodiment of the invention, in which a photocell or solar cell is coated with an organic luminescent coating for converting UV to green light, and for acting as an AR coating;

FIG. 2 shows curves illustrating the comparative performance of a conventional solar cell, and one coated with 100% quantum efficiency (Q.E.) organic material;

FIG. 3 shows curves illustrating the calculated quantum efficiency improvement of 10.9% when comparing a cell coated with 100% QE organic material to a conventional cell;

FIG. 5 shows curves illustrating the absorption spectra of $Alq_3$ films obtained from three different film thicknesses, while the inset shows light attenuation vs. film thicknesses at $\lambda=370$ nm, the slope giving the absorption coefficient;

DETAILED DESCRIPTION OF THE INVENTION

Figure 1C:
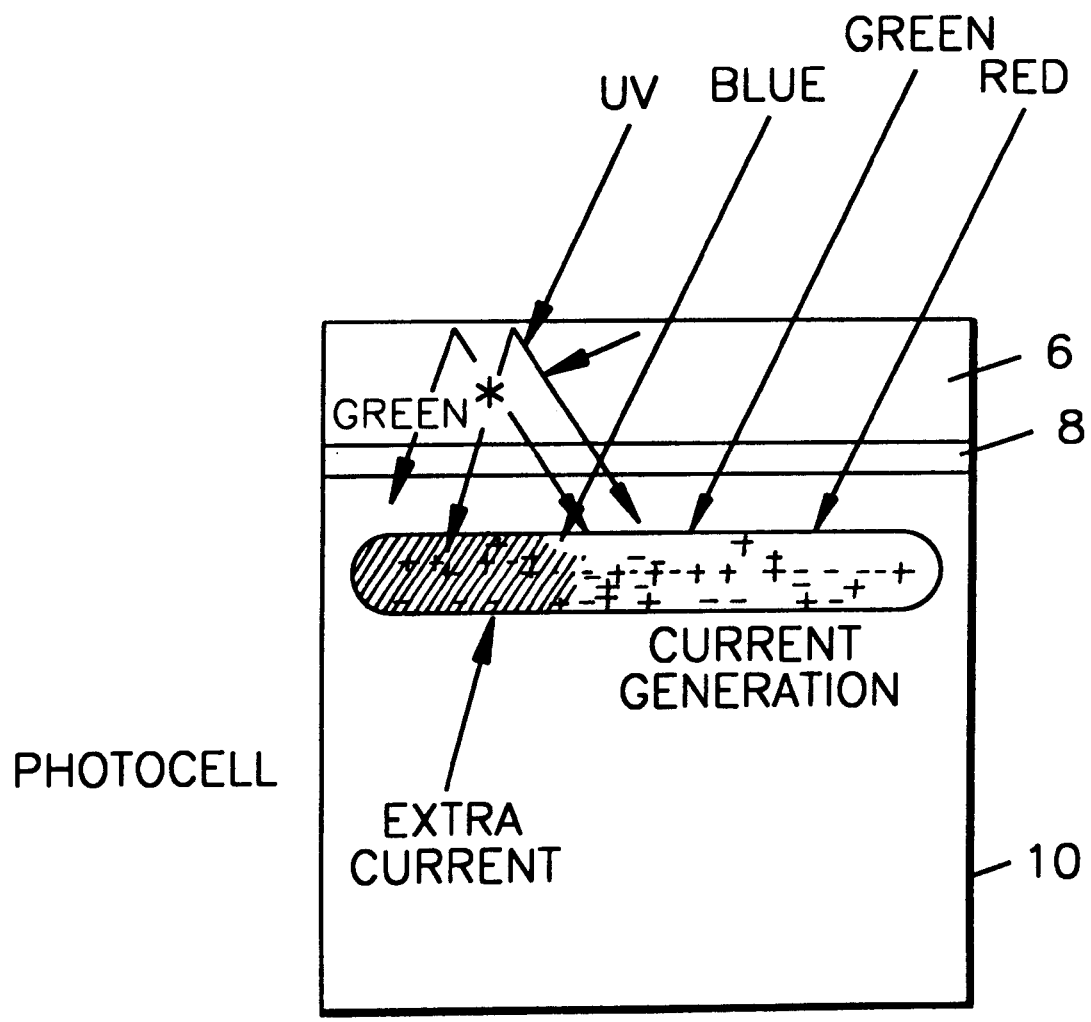
FIG. 1c shows another embodiment, in which a luminescent organic material is coated over a conventional AR coating.

In FIG. 1a, a photocell 4 is shown with a conventional monolayer AR coating 3 optimized for $\lambda=500$ nm. Device with such coatings undesirably reflect away substantial fractions of UV light with $\lambda<400$ nm causing reduced current generation in the photocell 4. Note that UV light energy is poorly utilized by photocells made out of conventional semiconductors such as Si (silicon), even if not reflected away. In FIG 1b, an improved solar cell 4 is provided in one embodiment of the invention by replacing the conventional AR coating 3 with an organic AR coating 2, as discussed below. $Alq_3$ can be such an organic coating. It is known that $Alq_3$ can be used as the electroluminescent layer of green optical light emitting diodes (OLEDs), in which case it has an external quantum efficiency of 1–2%. The absolute values of the external and internal quantum efficiencies ($\eta_e$ and $\eta_i$ respectively) of $Alq_3$ organic thin film photoluminescence have not previous to this invention been quantified, although C. W. Tang et al., "Electroluminescence of Doped Organic Thin Films", *J. Appl. Phys.* 65, No.9, p. 3610 (1989), cites an efficiency of 8% from unpublished experimental data. Unexpectedly, the present inventors discovered that when measured correctly, the internal quantum efficiency is as high as 32%. This efficiency remains constant as a function of excitation wavelength throughout the entire near-UV region (250–400 nm). The inventors' study of $Alq_3$ absorption revealed that the absorption coefficient for 250–300 nm light is $10^5$ cm$^{-1}$ to $4 \times 10^5$ cm$^{-1}$, whereas the absorption coefficient for wavelengths larger than 400 nm is <10 cm$^{-1}$. This film will efficiently convert the absorbed near-UV light into green light of 530 nm wavelength. Therefore, wavelengths greater than 400 nm are transmitted through the film with low loss, while more than one-half of near-UV light is absorbed in a 300–400 Å thick $Alq_3$ film. An organic thin film 2 can thus act as a UV-to-green light converter and at the same time serve as AR coating 2 for $\lambda$>400 nm, as shown in FIG. 1b.

It is well known that the efficiency of conventional photodiodes and solar cells decreases rapidly in the near-UV range. The dashed line in FIG. 2 (curve 16) illustrates the energy distribution of photons in the solar AM0 (atmospheric mass zero, the standard of intensity and wavelength distribution of sunlight in space) spectrum. Also plotted in FIG. 2 is the quantum efficiency of a typical conventional solar cell 4 with an AR coating 3, shown by curve 12 plotted between solid circles (R. A. Street, "Hydrogenated Amorphous Silicon", Cambridge University Press, 1991). It is clear that for wavelengths shorter than 400 nm, conventional cells (see FIG. 1a) can not provide efficient conversion of solar radiation. Also, curve 14 plotted between square points in FIG. 2 shows the calculated quantum efficiency for conventional cells coated with a 100% Q. E. organic material. Here, it was assumed that all the solar radiation with wavelengths less than 420 nm is absorbed by $Alq_3$ and converted into the 530 nm light (100% internal efficiency of luminescence). It is also assumed that all the photons emitted by the $Alq_3$ coating 2 are coupled into the solar cell 4 (see FIG. 1b), which is reasonable since the refraction index of Si is much higher than that of $Alq_3$ (1.73) or air (~1.00).

FIG. 3 illustrates photocurrent vs. wavelength curves for conventional solar cells (taken from M. A. Green, "High Efficiency Silicon Solar Cells", Trans Tech Publishing, p.416, 1987) represented by curve 18 plotted between solid circles, and the calculated spectrum (curve 20, plotted between open squares), for the same cell coated with a 100% Q. E. organic layer thick enough to absorb all the incident UV light (the exact film thickness should also satisfy the anti reflection condition for the solar radiation spectral maximum). The difference in area under these two curves, 18 and 20, corresponds to the expected solar cell power efficiency increase and is close to 11%. It should also be noted that design of the photocells 2,4 themselves may now be optimized for 530 nm, allowing for the use of more efficient, deep p-n junctions for solar cells.

It is apparent that a similar approach can be used to increase the UV sensitivity of photodiodes. Low reflectance in the UV range is provided by the low reflectance of the organic thin film. In this case, however, the film thickness should satisfy the antireflection condition for the UV light. For 250 nm wavelength UV, the quarter-wavelength AR coating thickness should be about 350 Å. This thickness of film is sufficient to fully absorb incident UV light, as discussed above. It should also be noted that, according to the measurements made by the inventors, the quantum efficiency of luminescence is independent of the film thickness for layers thicker than 100 Å, due to the relatively short diffusion length of excited states in amorphous organic compounds. There is, therefore, no obstacle to the utilization of extremely thin films of these compounds as AR luminescent coatings.

There are two additional advantages of UV-photodiodes with organic coatings. The first is the flatness of the coated photodiode response at wavelengths shorter than the absorption edge of the organic material coating. This is because the coating luminescence quantum efficiency does not depend on the excitation wavelength. This property facilitates photodiode calibration and simplifies analysis of the experimental results. The strong dependence of the uncoated photodiode photoresponse on the excitation wavelength is caused by intrinsic properties and can not be eliminated in the uncoated devices.

The second advantage is the visualization of UV radiation which is converted into the visible spectrum on the coated photodiode surface. It considerably simplifies positioning and alignment of the photodiode with respect to the incident light.

The ability to measure the luminescent properties of thin films, and of $Alq_3$ in particular, was critical in discovering $Alq_3$ as a material to be utilized in organic LED devices. Other materials may also be discovered via use of an innovative measuring technique based on the embodiment of the present invention, described in detail below.

Most studies to date have focused on understanding the mechanism of charge transport, and the specifics of electroluminescence of $Alq_3$-based OLEDs. However, data on the optical properties of solid films of $Alq_3$, which are crucial for the in-depth understanding of the operation of OLEDs and other optoelectronic devices, such as light detectors, are not available. For example, the data on optical absorption are apparently limited to the work of P. E. Burrows et al. (See *Appl. Phys. Lett.* 64, pg. 2285, 1993), where only a narrow spectral range was studied. The inventors believe that no previous data has been published on the photoexcitation spectra of $Alq_3$.

The absorption, photoexcitation, external and internal quantum efficiencies of $Alq_3$ thin films grown by thermal evaporation in vacuum have been successfully measured by the inventors. The absorption measurements determined absorption coefficients ($\alpha$) in solid films higher than $10^4$ cm$^{-1}$ in the spectral range between $\lambda$=250 nm and 425 nm. Investigation of the photoluminescence excitation (PLE) spectra shows that over this spectral range, the external Quantum Efficiency $\eta_e$ for the prominent green luminescence band (with a center wavelength at $\lambda$=530 nm) does not depend on the excitation radiation wavelength. Direct measurements of $\eta_e$ suggest that the efficiency of radiative transitions centered at 530 nm is much higher than previously assumed, exceeding 30% at room temperature. The discovery of this information, made possible via the inventors novel measurement methods, explains the lack of past interest in using $Alq_3$ in the manufacture of light detectors.

Measurement of $Alq_3$ optical characteristics was performed on $Alq_3$ films grown on glass, sapphire and silicon substrates. Prepurified $Alq_3$ films with thicknesses ranging from 50 Å to 1.35 μm were deposited under vacuum by thermal evaporation as described by P. E. Burrows et al., in "Electroluminescence from Trap-Limited Current Transport in Vacuum deposited Organic Light Emitting Devices", *Appl. Phys. Lett.* 64, p. 2285 (1994). Prior to growth, glass and sapphire substrates were cleaned by three successive rinses in boiling 1,1,1-trichloromethane, followed by three cycles in acetone, and a final rinse in boiling methanol. Silicon substrates were used as received from the manufacturer, with ~20 Å-thick native oxide layer on the surface. $Alq_3$ films grown on Si substrates were used for ellipsometric determination of the layer thickness and refractive index (n), which was determined to be n=1.73±0.05 at λ=633 nm.

Figure 4:
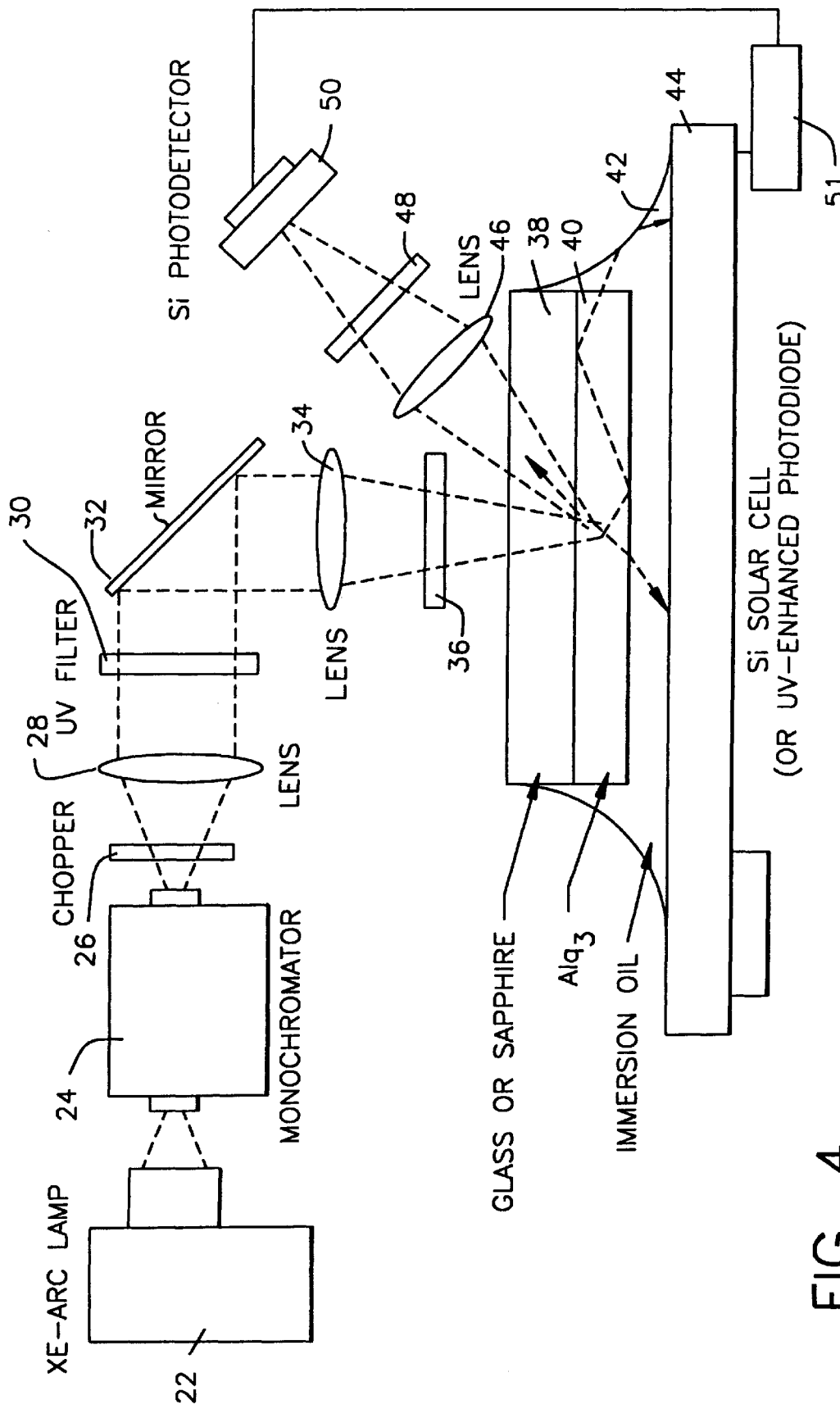
FIG. 4 shows an apparatus for measuring film spectral and luminescence properties.

As shown in FIG. 4, the experimental apparatus for measuring the film spectral properties consists of a 0.25 m monochromator 24 used to select light with a full width at half maximum of Δλ=15 nm from the broad spectral band of a Xe-arc lamp 22. After passing through a 165 Hz chopper 26, the excitation light is focused to a 1×2 mm spot using a $CaF_2$ lens system 28, 34, and a 45° angle tilted mirror 32. Calibrated, UV-enhanced 1 cm diameter Si-photodiode 50, and 4×2 cm Si solar cell 44 were used to detect PL and excitation radiation in conjunction with a current and lock-in amplifier 51. All measurements were made at room temperature.

For absorption measurements, a bandpass filter 36 with transmission between λ=250 nm and 420 nm was introduced between the sample and the Si-detector to eliminate the $Alq_3$ photoluminescence signal, as well as scattered light at λ>420 nm. Samples grown on sapphire substrates were used for the absorption experiments. The low intensity of the Xe-arc lamp 22 as well as the low sensitivity of the Si-detector 50 at λ<400 nm resulted in a small signal-to-background (scattered light) ratio for thick film samples (>5000 Å), and hence thinner samples (510 Å and 2400 Å) were used for absorption measurements in the short wavelength range. The results of the absorption measurements for three films of different thickness are given in FIG. 5 (see curves 52, 54 and 56). The absolute value of the absorption coefficient is calibrated at λ=370 nm by measuring transmission through several samples of different thicknesses (see inset, FIG. 5, curve 58), and is $\alpha=(4.4\pm0.1)\times10^4$ cm$^{-1}$. FIG. 5 shows that the overlap of two broad absorption bands with maxima at λ=385 nm and λ=260 nm (indicated by arrows) results in $\alpha>10^4$ cm$^{-1}$ over the entire spectral range from λ=425 nm to λ=250 nm, which is the short wavelength detection limit of the apparatus.

Figure 6A:
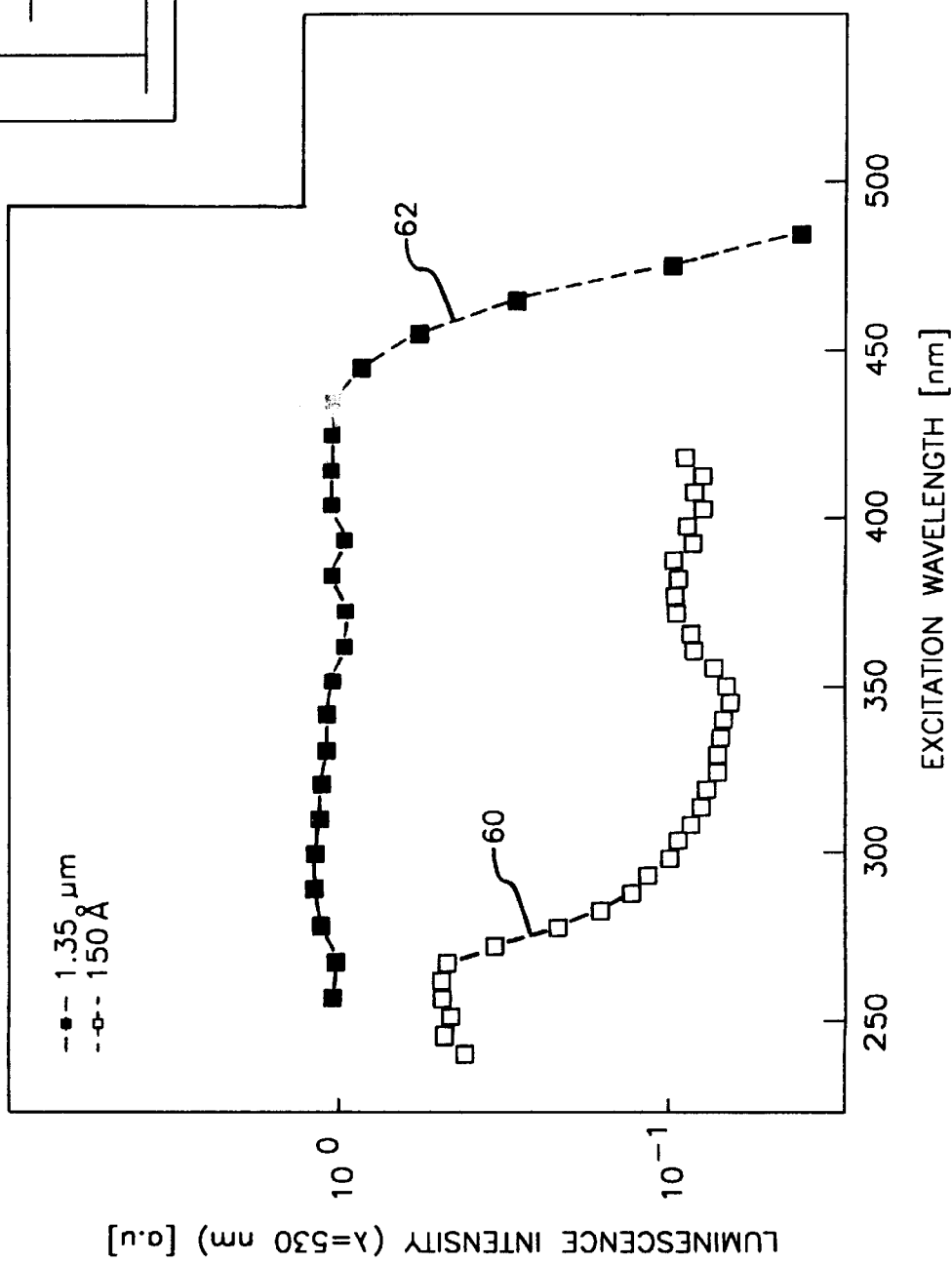
FIG. 6 shows curves illustrating the photoluminescence (PL) excitation spectra for film thicknesses of 150 Å and 1.35 $\mu$m, while the inset is a schematic of a $Alq_3$-excited state relaxation process.

In FIG. 6, the λ=530 nm PLE (photoluminensce excitation) spectra for thin (150 Å) $Alq_3$ is shown by curve 60, and for thick (1.35 μm) $Alq_3$ films is shown by curve 62. For thin samples, the PLE spectral maximum corresponds to the short wavelength absorption maximum at λ=260 nm. The 1.35 μm thick sample, however, absorbs 95% of the incident light at all wavelengths shorter than λ=425 nm. The plateau at λ<425 nm in the PLE spectrum of this sample indicates that the external efficiency for the green luminescence does not depend on the excitation photon energy, and has the same value for both the λ=385 nm and λ=260 nm absorption bands.

Determination of the absolute value of the external PL efficiency, $\eta_c$, was accomplished using a bandpass filter 36 with peak transmission at λ=370 nm placed immediately above the sample (see FIG. 4) to reduce scattered light from the monochromator. A 1.35 μm thick organic film 48, such as $Alq_3$ film, on a glass substrate 38 was set directly onto the surface of the silicon solar cell 44. Using the values obtained for α, (FIG. 6), and taking into account the decreased UV photoresponse of the Si solar cell 44 as compared to its response at longer(~500 nm) wavelengths (see FIGS. 2 through 12), it was found that λ=370 nm radiation transmitted through the 1.35 μm thick film does not contribute appreciably to the diode photoresponse, and hence can be neglected. The PL efficiency for λ=370 nm, integrated over a 2 π solid angle (estimated as discussed by Garbuzov in *J. Luminescence* 27, p.109, (1982)), gives $\eta_c$ from 2.8% to 10%. This measured external PL efficiency depends on the excitation area, the thickness of the organic film and area of the substrate, indicating that the measured value of $\eta_c$ is strongly affected by scattering losses and waveguiding of PL in the film and the glass substrate. Note that waveguiding effects, substrate losses and other experimental artifacts have also been observed to distort the results of $\eta_c$ measurements using an integrating sphere. In the present invention one embodiment includes an apparatus to measure film spectral properties, which provides improvements that overcome these limitations of the prior art.

The film 40 measured by the present apparatus is deposited on a glass substrate 38 and is thick enough to absorb all the excitation radiation. The substrate is placed film side down on the surface of a calibrated Si solar cell 44. The excitation radiation is focused at the film 40 through the glass 38. The film luminescence power is measured by the solar cell 44 (all the radiation (P) coupled out from the sample in 2 π solid angle) and by the second photodetector 50, located over the sample (which signal with amplitude A, is proportional to the intensity of radiation that is coupled out in the direction opposite to the solar cell 44).

Then refractive index matching fluid 42 is placed between the film or coating 40 and solar cell 44, and measurements are repeated under the same excitation level. The lower limit to the internal quantum efficiency of the film is calculated as:

$$\eta_c = (P_1 + PB/A)/P_0, \text{ where:} \quad (1)$$

P represents the film luminescence power coupled out from the sample in a 2 π solid angle and measured by the solar cell 44 under the condition of no immersion;

$P_1$ is the luminescence power measured by the solar cell 44 in the case of immersion;

$P_0$ is the power of the excitation radiation;

A is the signal of the second photodetector 50 under the condition of no immersion; and B is the signal of the second photodetector 50 under the condition of immersion, B<A.

EXAMPLE 1

In the first embodiment, the samples comprised of the combination of substrate 38 and $Alq_3$ coating 40 are placed film-side-down in index of refraction-matching fluid 42 (with n=1.524) dropped onto the surface of the solar cell 44. Under these conditions $\eta_c=28\%$ for the radiation emitted towards the solar cell 44 was obtained. In order to evaluate the PL intensity in the opposite direction (through the glass slide 38), an identical sample was placed on the solar cell 44 without the immersion oil 42, and the PL signals of the two samples were compared using a second photodetector 50 placed above the samples (see FIG. 4). The PL efficiency, as recorded by the second photodetector 50, of the immersed sample was 0.8 times as large as that of the non-immersed sample, whose efficiency was measured by the solar cell 44 to be ~3.6%. Therefore, the total efficiency of the immersed samples was 28%+(0.8)×3.6%≈31%. This number can be considered as a lower limit for $\eta_c$ since the refractive index of the immersion fluid is less than n for Alq$_3$, and hence the waveguiding losses to the Alq$_3$ film, although improved, are not completely eliminated.

EXAMPLE 2

In the second, preferred embodiment, the luminescence intensities of the 1.35 μm thick film grown on Si substrate is compared with that of the film grown on a glass substrate. Since the refractive index of Si (4.16 at λ=530 nm) is much higher than that of Alq$_3$, waveguide losses are eliminated and only photons emitted at angles smaller than the total internal reflection angle (35° w.r.t. normal) can contribute to $\eta_c$. In this case, a good approximation to $\eta_c$ is given by $\eta_c = \eta_i(1-R_1)(1+R_2)(n-(n^2-1)^{1/2})(2n)^{-1}$. Where n is the luminescent film refractive index (in this case the luminescent film is Alq$_3$). $R_1$ and $R_2$ are the Fresnel reflection coefficients for the PL radiation at the luminescent film-air interface and semiconductor-luminescent film interfaces, respectively, averaged over angles<35°. The $(1-R_1)(1+R_2)$ product is 1.09 for Alq$_3$-air and Si-Alq$_3$, while $(n-(n^2-1)^{1/2})(2n)^{-1} \approx 0.093$. This gives a ten fold difference between $\eta_c$ and $\eta_i$ caused by the total internal reflection at the Alq$_3$-air interface, perhaps explaining why past efforts that did not use the improvement of index matching fluid coupling failed to anticipate how high the efficiency of Alq$_3$ actually is. Using the previous calibration efficiency of the film on glass (see above), it is found that the value of $\eta_c$ for the film on the Si substrate equals to (3.2±0.2%). The inventors, by using the above equation, calculated that the internal efficiency for the green luminescent band centered at λ=530 nm is $\eta_i=(32\pm2)\%$. Note that this is 10× the (3.2±0.2%) absolute value of $\eta_c$ for the film on the Si substrate, which requires using the previous calibration efficiency of the film on glass, which in turn requires the immersion oil improvement of example 1.

The difference between the calculated $\eta_i$ and the measured $\eta_c$ of the immersed samples is unexpectedly small if one considers the large fraction of luminescence waveguided in the Alq$_3$ film 40 sandwiched between the immersion oil 42 and the glass 38. However, a considerable fraction of this waveguided radiation is also collected by the solar cell 44 due to total internal reflection at the oil-air interface, as shown in FIG. 4. Thus, the results obtained by both embodiments, as shown in examples 1 and 2, are in good agreement.

EXAMPLE 3

Figure 7:
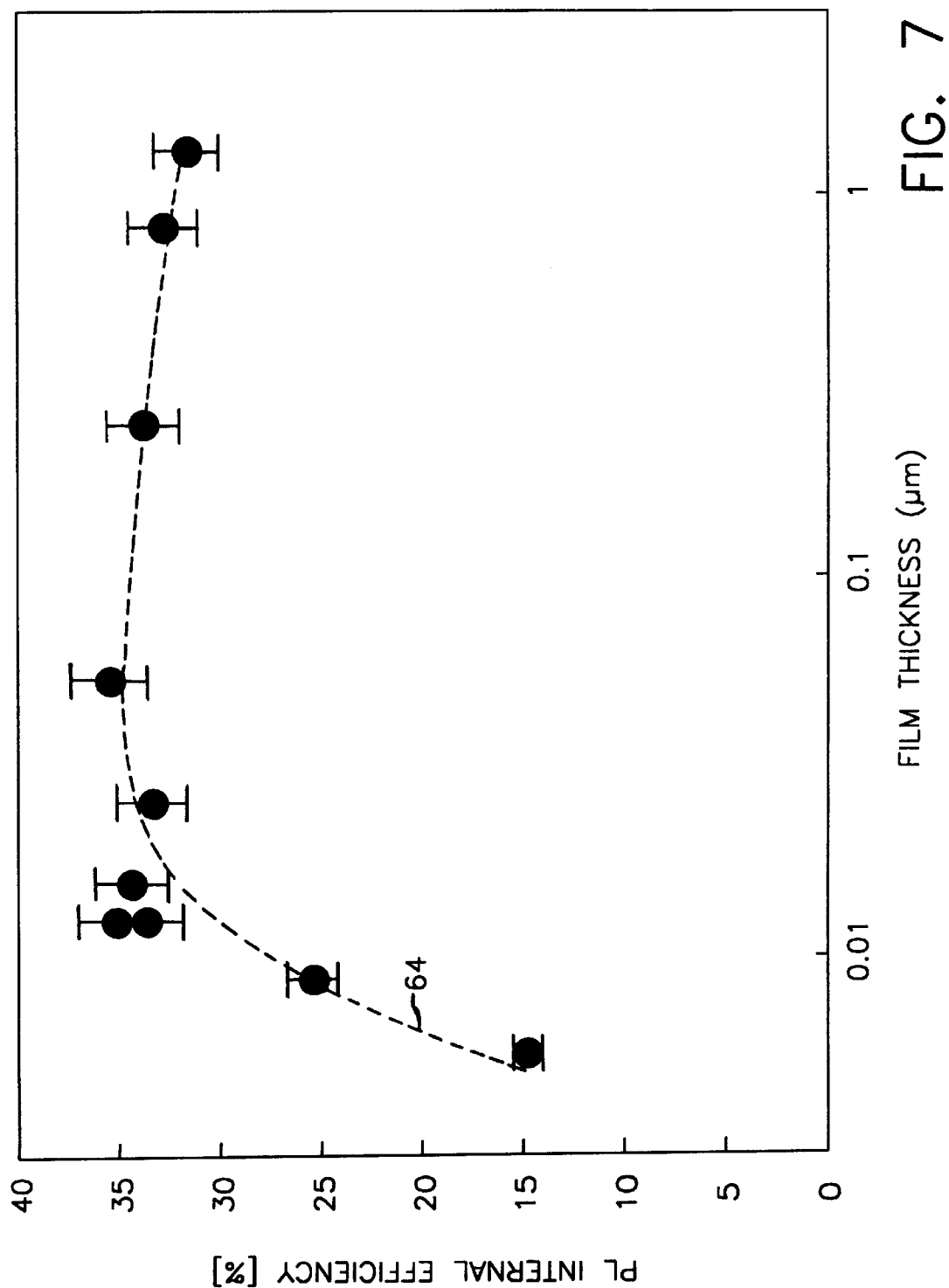
FIG. 7 shows a curve illustrating the dependence of the internal luminescence efficiency for the $\lambda=530$ nm band vs. film thickness for films grown on glass, the excitation wavelength for these data being 370 nm.

The dependence of the internal luminescence efficiency on film thickness for samples grown on glass substrate is shown by curve 64 in FIG. 7. To obtain these data, the luminescence from both the thin and previously calibrated thick samples is measured with a low pass filter (passing λ>420 nm) placed over the photodetector 44 to eliminate any non-absorbed excitation and scattered light from the monochromator 24. The amount of absorbed excitation light is directly measured for films with thickness >500 Å, and is calculated for thinner films using the data in the inset of FIG. 5. Data shown in FIG. 7 correspond to freshly prepared samples, with air exposure times <5 hours. No efficiency oscillations with film thickness were observed which could be attributed to microcavity or interference effects [5] due to the low reflectance of the Alq$_3$-glass interface and coordinate-angle averaging of these effects. In FIG. 7, curve 64 demonstrates that the luminescence efficiency of Alq$_3$ films remains constant over two orders of magnitude of thickness, with a noticeable drop in efficiency observed only for films thinner than 100 Å. The dependence of PL efficiency on organic film thickness is important to know when designing the luminescent AR coating.

Although various embodiments of the invention are shown and illustrated above, they are not meant to be limiting. Those skilled in the art may recognize certain modifications to these embodiments, which are meant to be covered by the spirit and scope of the appended claims. For example, C. W. Tang et al., "Electroluminescence of Doped Organic Thin Films", *J. Appl. Phys.* 65, No.9 3610 (1989), teaches that Alq$_3$ may be doped with traces of coumarin 540 and DCM1 to increase its efficiency and to shift its emission from the green to anywhere between the blue-green to orange-red regions of the spectrum.

Figure 8:
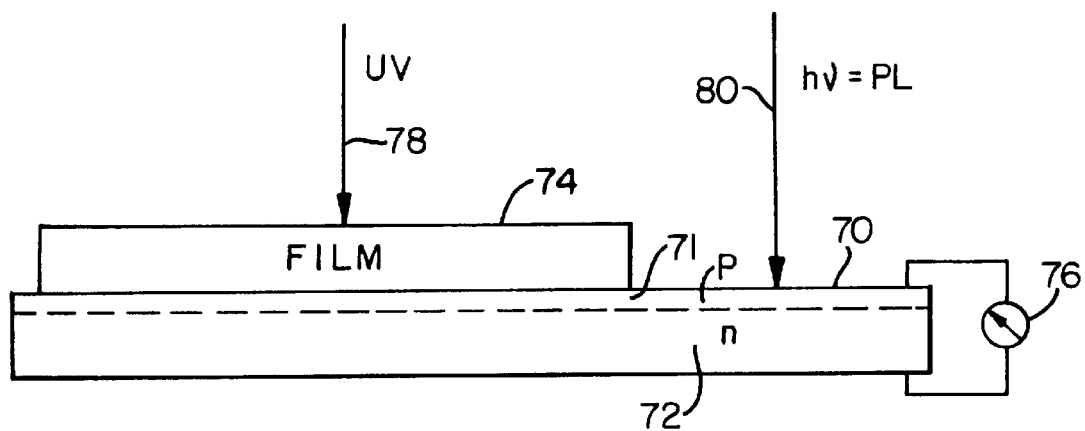
FIG. 8 shows an end view of a simple apparatus set-up and method for measuring film luminescence properties for another embodiment of the invention.

As a further example of another embodiment of the invention, for estimation of the internal quantum efficiency $\eta_i$ of a film, reference is made to FIG. 8.

In this embodiment, the material of interest is deposited directly at a Si-photodiode 70 surface as a film 74. The photodiode includes a p layer 71 and an n layer 72. In this case, the value of $\eta_i$ can be estimated from simple equations and the measurement of the magnitude of current flowing through photodiode 70 via a current measuring device 76:

$$J_q = I_{sh} \eta_i \beta_{Ph} \qquad (1)$$

where $J_q$ is the photodiode photocurrent (in electrons/second) measured by current measuring device 76, $I_{sh}$ is the intensity of the UV excitation radiation 78 (in photons/second), and $\beta_{Ph}$ (in electrons/photon) is the photodiode quantum efficiency at a wavelength corresponding to the peak of film 74 photo-luminescence.

Also, D. Z. Garbuzov, et al., "Organic film deposited on Si p-n junctions: Accurate measurements of florescence internal efficiency, and application to luminescent antireflection coatings", *Journal of Applied Physics*, Vol. 80, No. 8, Oct. 15, 1996, pages 4644–4648, shows and describes the results obtained by the present inventors for testing materials other than Alq$_3$. More specifically, through use of the present invention, coatings of TPD {N,N'-diphenyl-N, N'-bis-(3-methylphenyl)-1, 1'-biphenyl-4,4' diamine}, and of Gaq'$_2$Cl {bis(8-hydroxyquinaldine)-chlorogallinm} were tested, resulting in the measurement of internal fluorescence efficiency $\eta_i$ of 0.35±0.3, and 0.36±0.3, respectively.

Other efficient chromophores have also been identified by the inventors for use as high efficiency florescent anti-reflection (AR) coatings. These materials include polyphenylenevinylene, which can be prepared as a very uniform and flat film via wet chemical growth; and distyrylarylene derivatives, which are vacuum depositable (see C. Hosokawa, et al., *Appl. Phys. Lett.*, Vol. 67, pages 3853–3855 (1995)). Another material is Al (acetylacetonate)3 [Al (acac)3], a compound that absorbs in the ultraviolet spectral region, and emits blue or purple spectral region.

We claim:
1. A combination comprising:
    a light detector selected from the group consisting of photocells, photodiodes and solar cells; and
    an organic luminescent coating on said light detector capable of converting UV radiation to visible as said

UV radiation is absorbed in passing through said coating into said light detector, wherein the thickness of said organic coating is thick enough to absorb substantially all the UV radiation incident on said luminescent organic coating while still satisfying the anti-reflection condition for the solar radiation spectral maximum.

2. The combination of claim 1, wherein said coating is selected from the group consisting of aluminum-tris-quinolate; bis-(8-hydroxyquinadine)chlorogallium; N,N'-diphenyl-N,N'-bis(3-methylphenyl)1-1' biphenyl-4,4' diamine; polyphenylenevinylene and distyrylarylene derivatives.

3. The combination of claim 1 wherein said visible radiation is in the blue region of the visible spectrum.

4. The combination of claim 1 wherein said visible radiation is in the green region of the visible spectrum.

5. The combination of claim 1 wherein said visible radiation is in the red region of the visible spectrum.

6. A combination comprising:

a light detector; and an organic luminescent coating on said light detector capable of converting UV radiation to visible radiation as said UV radiation is absorbed in passing through said coating into said light detector, wherein said coating is selected from the group consisting of aluminum-tris-quinolate, bis-(8-hydroxyquinaldine)-chlorogallium, N,N'-diphenyl-N,N'-bis(3-methylphenyl) 1,1'biphenyl-4,4'diamine, polyphenylenevinylene and distyrylarylene derivatives.

7. The combination of claim 6, wherein the light detector is selected from the group consisting of photocells, photodiodes and solar cells.

8. The combination of claim 7, wherein the light detector is made from silicon.

9. The combination of claim 7, wherein the light detector is made from gallium arsenide.

10. The combination of claim 6, wherein the light detector further includes a conventional anti-reflection coating.

11. The combination of claim 6, wherein the Aluminum-Tris-Quinolate coating is from about 100 Å to about 1.35 $\mu$m in thickness.

12. The combination of claim 6, wherein the Aluminum-Tris-Quinolate coating is from about 300 Å to about 400 Å in thickness.

* * * * *

UNITED STATES PATENT AND TRADEMARK OFFICE
CERTIFICATE OF CORRECTION

PATENT NO. : 5,986,268

DATED : November 16, 1999

INVENTOR(S) : Stephen R. FORREST et al.

It is certified that error appears in the above-identified patent and that said Letters Patent is hereby corrected as shown below:

Column 1, line 17, change "Contract No." to -- NREL subcontract number -- ;

Column 1, line 17, change "Air Force" to -- Department of Energy --;

Column 2, line 2, change "4'-diamine]}," to -- 4'-diamine} --;

Column 2, line 43, change "5" to -- 5A --;

Column 2, line 45, after "inset" insert -- , Fig. 5B, --;

UNITED STATES PATENT AND TRADEMARK OFFICE
CERTIFICATE OF CORRECTION

PATENT NO. : 5,986,268

DATED : November 16, 1999

INVENTOR(S) : Stephen R. FORREST et al.

It is certified that error appears in the above-identified patent and that said Letters Patent is hereby corrected as shown below:

Column 2, line 47, change "6" to -- 6A --; and

Figure 6B:
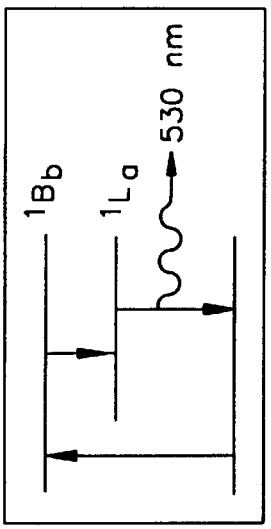

Column 2, line 49, after "inset" insert -- , Fig. 6B, -- .

Signed and Sealed this

Third Day of April, 2001

*Attest:*

NICHOLAS P. GODICI

*Attesting Officer*     *Acting Director of the United States Patent and Trademark Office*